(12) United States Patent
Truemper

(10) Patent No.: US 10,611,482 B2
(45) Date of Patent: Apr. 7, 2020

(54) SPACE-OPTIMIZED COOLING SYSTEM FOR A GALLEY, AND METHOD OF OPERATING SUCH A COOLING SYSTEM

(71) Applicant: Airbus Operations GmbH, Hamburg (DE)

(72) Inventor: Torsten Truemper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 193 days.

(21) Appl. No.: 15/830,732

(22) Filed: Dec. 4, 2017

(65) Prior Publication Data

US 2018/0086469 A1 Mar. 29, 2018

Related U.S. Application Data

(63) Continuation of application No. PCT/EP2016/062510, filed on Jun. 2, 2016.

(30) Foreign Application Priority Data

Jun. 3, 2015 (DE) .......................... 10 2015 210 268
Jun. 3, 2015 (DE) .......................... 10 2015 210 269
Jun. 3, 2015 (DE) .......................... 10 2015 210 271

(51) Int. Cl.
*B64D 11/04* (2006.01)
*B64D 13/08* (2006.01)
*B64D 13/06* (2006.01)

(52) U.S. Cl.
CPC .............. *B64D 11/04* (2013.01); *B64D 13/08* (2013.01); *B64D 2013/0629* (2013.01);
(Continued)

(58) Field of Classification Search
CPC .................... B64D 11/04; B64D 13/08; B64D 2013/0629; B64D 2013/0655;
(Continued)

(56) References Cited

U.S. PATENT DOCUMENTS 4,361,014 A * 11/1982 Blain .................... A47J 39/006
62/237
4,969,509 A 11/1990 Merensky
(Continued)

FOREIGN PATENT DOCUMENTS

DE 3209492 10/1982
DE 3812739 7/1989
(Continued)

OTHER PUBLICATIONS

International Search Report, dated Jul. 28, 2016, priority document.

*Primary Examiner* — Joel M Attey
(74) *Attorney, Agent, or Firm* — Greer, Burns & Crain Ltd.

(57) ABSTRACT

A galley cooling system for installation in a transportation means, in particular an aircraft, comprises a cooling device comprising a coolant circuit configured to be flowed through with a coolant. The cooling system further comprises a first fluid line configured to be flowed through with a first fluid and being thermally coupled with the coolant circuit to transfer heat from the first fluid line fluid to the coolant circuit coolant, and a second fluid line configured to be flowed through with a second fluid and being thermally coupled to the coolant circuit to transfer heat from the coolant circuit coolant to the second fluid line fluid. The second fluid line comprises a first portion integrated into or arranged adjacent to a galley worktop, the first portion of the second fluid line being configured to be flowed through with the second fluid in a direction parallel to the worktop.

18 Claims, 3 Drawing Sheets

(52) U.S. Cl.
CPC ............. *B64D 2013/0655* (2013.01); *F25B 2339/047* (2013.01); *F25B 2600/112* (2013.01); *F25B 2600/2511* (2013.01); *F25B 2700/21173* (2013.01); *Y02T 50/44* (2013.01); *Y02T 50/46* (2013.01); *Y02T 50/56* (2013.01)

(58) Field of Classification Search
CPC .......... F25B 2339/047; F25B 2600/112; F25B 2600/2511; F25B 2700/21173; Y02T 50/44; Y02T 50/46; Y02T 50/56
USPC .......................................................... 165/56
See application file for complete search history.

(56) References Cited

U.S. PATENT DOCUMENTS

| | | | |
|---|---|---|---|
| 5,491,979 | A | 2/1996 | Kull et al. |
| 5,513,500 | A | 5/1996 | Fischer et al. |
| 7,780,114 | B2 | 8/2010 | Doebertin et al. |
| 7,802,732 | B2 | 9/2010 | Scherer et al. |
| 8,495,887 | B2 * | 7/2013 | Simadiris ............... B64D 11/04 62/185 |
| 2005/0061012 | A1 | 3/2005 | Zywiak et al. |
| 2007/0119584 | A1 | 5/2007 | Scherer et al. |
| 2008/0001031 | A1 | 1/2008 | Doebertin |
| 2009/0000329 | A1 | 1/2009 | Colberg et al. |
| 2011/0067838 | A1 | 3/2011 | Soenmez et al. |
| 2012/0025679 | A1 | 2/2012 | Roering |
| 2013/0047657 | A1 | 2/2013 | Oswald |
| 2013/0076214 | A1 | 3/2013 | Chamberlin et al. |
| 2013/0169130 | A1 * | 7/2013 | Seeck ............... B64D 11/0007 312/236 |
| 2013/0269384 | A1 | 10/2013 | Burd |
| 2014/0298824 | A1 | 10/2014 | Truemper et al. |
| 2015/0007600 | A1 | 1/2015 | Godecker et al. |
| 2015/0059384 | A1 | 3/2015 | Burd et al. |
| 2015/0059385 | A1 | 3/2015 | Burd |
| 2015/0089968 | A1 | 4/2015 | Lu |
| 2015/0151842 | A1 | 6/2015 | Weixler |

FOREIGN PATENT DOCUMENTS

| | | |
|---|---|---|
| DE | 4340317 | 6/1995 |
| DE | 19733934 | 7/1998 |
| DE | 102006023047 | 11/2007 |
| DE | 602004010166 | 8/2008 |
| DE | 102008023636 | 12/2009 |
| DE | 102010031909 | 1/2012 |
| DE | 102013005595 | 10/2014 |
| DE | 102013005596 | 10/2014 |
| EP | 1701884 | 9/2006 |
| EP | 1979233 | 10/2008 |
| EP | 2799343 | 11/2014 |
| WO | 2012025200 | 3/2012 |
| WO | 2012040564 | 3/2012 |
| WO | 2013033439 | 3/2013 |
| WO | 2014012746 | 1/2014 |
| WO | 2015003073 | 1/2015 |
| WO | 2015031539 | 3/2015 |
| WO | 2015031658 | 3/2015 |
| WO | 2015050971 | 4/2015 |

* cited by examiner

SPACE-OPTIMIZED COOLING SYSTEM FOR A GALLEY, AND METHOD OF OPERATING SUCH A COOLING SYSTEM

CROSS-REFERENCES TO RELATED APPLICATIONS

This application is a continuation of International Application PCT/EP2016/062510 filed Jun. 2, 2016, designating the United States and published on Dec. 8, 2016 as WO 2016/193378. This application also claims the benefit of the German patent application Nos. 10 2015 210 268.8, 10 2015 210 269.6, and 10 2015 210 271.8 all filed on Jun. 3, 2015. The entire disclosures of the above are incorporated herein by way of reference.

BACKGROUND OF THE INVENTION

The invention relates to a cooling system for a galley for installation in a transportation means, in particular an aircraft, and to a method of operating such a cooling system. The invention relates further to a galley equipped with such a cooling system.

Modern commercial aircraft are conventionally equipped with galleys known, for example, from DE 10 2006 023 047 B4 or U.S. Pat. No. 7,780,114 B2. The galleys are generally installed in the region of the doors of the aircraft cabin and have a carcass having a base structure delimited by a worktop, as well as overhead cabinets arranged above the worktop. Kitchen equipment, such as, for example, coffee machines, water boilers, ovens, etc., as well as drinks and foodstuffs are usually stored in the overhead cabinets of the galley. In the base structure of the galley, on the other hand, there is arranged a galley compartment, which is conventionally cooled, for accommodating movable trolleys which are loaded with items, such as, for example, drinks and foodstuffs, which are to be served to the passengers on board the aircraft.

It is known from DE 43 40 317 C2 and U.S. Pat. No. 5,513,500 or EP 1 979 233 A1 and US 2009/000329 A1 to cool a galley compartment suitable for accommodating trolleys by means of a cooling station which is connected to a central cooling system of the aircraft and is supplied with cooling energy by a central installation for cold production. The cooling station is connected to the central installation for cold production via a cooling circuit in which a liquid or a two-phase cooling agent circulates. Alternatively, a galley compartment suitable for accommodating trolleys can also be supplied with cooling energy by means of a local cooler associated with the galley. The local cooler may be in the form of an air chiller, for example, and may be designed to operate with a two-phase coolant, that is to say, a coolant which is converted from the liquid state to the gaseous state when it takes up heat from the galley compartment to be cooled. The coolant of the air chiller takes up heat from an air stream which, after flowing through the air chiller, is blown into the galley compartment to be cooled.

Irrespective of whether the cooling energy for cooling a galley compartment is provided by a central cooling system of the aircraft or by a local independent cooler associated with the galley, in a galley having a cooled galley compartment, lines for supplying cooling air into the cooled galley compartment or for removing waste air from the cooled galley compartment are conventionally installed in the region of a rear wall of the galley carcass. Furthermore, corresponding installation space must also be provided in the galley for a cooling station of a central cooling system or a local cooling device in the form of an air chiller, for example, for installation in the galley.

SUMMARY OF THE INVENTION

An object underlying the invention is to provide a cooling system for a galley which is space-optimized and can be operated energy-efficiently. The invention is further directed at an object of providing a method of operating such a cooling system. Finally, an object underlying the invention is to provide a galley equipped with such a cooling system.

A cooling system for a galley for installation in a transportation means, in particular an aircraft, comprises a cooling device which comprises a coolant circuit configured to be flowed through with a coolant. The coolant circulating in the coolant circuit of the cooling device may be a gaseous or liquid coolant but is preferably a two-phase coolant which is converted from the liquid state to the gaseous state when it takes up heat from a cooling energy consumer and is then converted back into the liquid state again. Accordingly, there may be provided in the coolant circuit of the cooling device an evaporator, in which the two-phase coolant is converted from the liquid state to the gaseous state while taking up heat, and a condenser, in which the two-phase coolant is converted from the gaseous state back into the liquid state again while giving off heat. The cooling device may be in the form of a cooling station which is connected to a central cooling system of the transportation means and is supplied with cooling energy by a central installation for cold production. Alternatively, however, the cooling device may also be in the form of an independent cooling device and, in particular, in the form of an air chiller.

The cooling system further comprises a first fluid line which is configured to be flowed through with a first fluid and which is thermally coupled with the coolant circuit of the cooling device in order to transfer heat from the first fluid flowing through the first fluid line to the coolant circulating in the coolant circuit. A first fluid to be cooled by means of the cooling device thus flows through the first fluid line. In particular, when the cooling device is in the form of an air chiller, the first fluid is preferably air. Thermal coupling between the coolant circuit of the cooling device and the first fluid line may be established, for example, by means of a first heat exchanger which, in particular, when a two-phase coolant is circulating in the coolant circuit of the cooling device, is preferably in the form of an evaporator.

A second fluid may flow through a second fluid line of the cooling system, which is thermally coupled with the coolant circuit of the cooling device, in order to transfer heat from the coolant circulating in the coolant circuit to the second fluid flowing through the second fluid line. A second fluid thus flows through the second fluid line, which second fluid takes up heat from the coolant circulating in the coolant circuit of the cooling device and thereby cools the coolant to a lower temperature. The second fluid flowing through the second fluid line is also preferably air. Thermal coupling between the coolant circuit of the cooling device and the second fluid line may be established, for example, by means of a second heat exchanger which, in particular, when a two-phase coolant is circulating in the coolant circuit of the cooling device, is preferably in the form of a condenser.

The second fluid line comprises a first portion integrated into or arranged adjacent to a worktop of the galley, wherein the first portion of the second fluid line is configured to be flowed through with the second fluid in a direction parallel to the worktop. In particular, the first portion of the second fluid line may extend substantially parallel to the worktop, i.e., parallel to a lower and/or an upper surface of the worktop. In case the first portion of the second fluid line is arranged adjacent to the worktop, the first portion of the second fluid line may be arranged either below the lower surface of the worktop or above the upper surface of the worktop. A first portion of the second fluid line, which is arranged adjacent to the worktop, may be connected to a further portion of the second fluid line which extends substantially perpendicular to the upper and the lower surface of the worktop through the worktop.

The first portion of the second fluid line can accordingly establish a fluid-conducting connection between overhead cabinets of the galley arranged above the worktop and a base structure of the galley arranged beneath the worktop, without requiring excess additional installation space, for example in the region of a rear wall of the galley therefor. The second fluid line can therefore be integrated in a particularly space-saving manner into a kitchen for installation in a transportation means, in particular an aircraft, whereby, for example, in the region of the base structure of the galley, sufficient installation space for integration of the cooling device into the galley remains. When the cooling device is mounted in the region of the base structure of the galley, the first portion of the second fluid line is preferably arranged downstream, relative to the direction of flow of the second fluid through the second fluid line, of a portion of the second fluid line that is thermally coupled with the coolant circuit of the cooling device.

The cooling system can then be configured with very short line paths and is consequently distinguished by a low weight, as well as low pressure and cooling energy losses, and therefore by high energy efficiency. Moreover, the outlay for final mounting of the cooling system and the galley equipped with the cooling system in the transportation means is reduced, since the cooling system and the galley have a reduced number of interfaces with superordinate systems of the transportation means. Finally, in case the first portion of the second fluid line is guided through the worktop of the galley, noise which is produced by a feed device for feeding the second fluid through the second fluid line, as well as by the flow of the second fluid through the second fluid line, is advantageously damped. This not only improves the comfort of the cabin personnel of the transportation means working in a galley equipped with the cooling system, but also minimizes the annoyance due to noise to which passengers in the transportation means seated close to the galley are exposed.

In case the first portion of the second fluid line is integrated into the worktop, and/or in case the first portion of the second fluid line is arranged adjacent to the worktop below a lower surface of the worktop, the second fluid line may comprise at least one fluid inlet formed in an upper side of the worktop adjacent to a rear wall of the galley. In case the first portion of the second fluid line is arranged adjacent to the worktop above an upper surface of the worktop, at least one fluid inlet may be formed in an upper wall of the first portion of the second fluid line.

The fluid inlet preferably opens into an interior of an overhead cabinet of the galley, so that air can be discharged from the interior of the overhead cabinet of the galley via the fluid inlet, guided as the second fluid through the second fluid line, and finally used for cooling the coolant circulating in the coolant circuit of the cooling device. The discharge of air from the overhead cabinet of the galley through the second fluid line relieves a cabin ventilation system provided for discharging waste air from the galley and can additionally improve the operating efficiency of independently cooled kitchen equipment, such as, for example, wine coolers or the like, installed in the overhead cabinet of the galley. Finally, the discharge of air from the overhead cabinet of the galley through the second fluid line reduces the pressure in the region of the galley, which prevents unpleasant odors from the region of the galley from reaching a region of the passenger cabin of the transportation means adjacent to the galley.

A feed device for feeding the second fluid through the second fluid line is preferably in the form of a fan and may be integrated into the cooling device, for example, or may be arranged, relative to the direction of flow of the second fluid through the second fluid line, downstream of the cooling device in a portion of the second fluid line which extends through the base structure of the galley. If desired, the second fluid line may also comprise a plurality of fluid inlets which may be formed, for example, in the upper side of the worktop distributed along the rear wall of the galley.

The cooling system preferably further comprises a filter element arranged, relative to the direction of flow of the second fluid towards the fluid inlet of the second fluid line, upstream of the fluid inlet of the second fluid line in the region of the rear wall of the galley. The filter element serves to filter air discharged from the interior of the overhead cabinet via the second fluid line before it enters the fluid inlet of the second fluid line. This prevents unpleasant odors and dirt, for example from an oven or from foodstuffs stored in the overhead cabinet of the galley, from reaching the area surrounding the galley via the second fluid line. Since the second fluid line does not require any installation space in the region of the rear wall of the galley, the filter element may be formed over a large area and is consequently distinguished by a very good filtering action, with at the same time a long service life, and moreover causes only small pressure losses in the second fluid line. In addition, the filter element damps the noise produced by the feed device for feeding the second fluid through the second fluid line as well as by the flow of the second fluid through the second fluid line.

The first portion of the second fluid line may comprise a first sub-portion extending parallel to the rear wall of the galley and a second sub-portion extending substantially perpendicularly to the rear wall of the galley. A plurality of fluid inlets is preferably arranged distributed along the first sub-portion, so that second fluid, in particular air, flowing along the rear wall of the galley can be guided over a large area via the fluid inlets into the first sub-portion of the first portion of the second fluid line and finally via the second sub-portion towards a central region of the worktop. The second fluid can thus be guided towards a cooling device which is installed at a distance from the rear wall of the galley. A gap between the cooling device and the rear wall of the galley can then advantageously be used as installation space for supply lines for the galley, such as, for example, water lines, vacuum lines or the like.

The second fluid line preferably comprises a second portion which connects the first portion of the second fluid line integrated into the worktop of the galley to the cooling device and thus establishes a connection between the first portion of the second fluid line and the portion of the second fluid line that is thermally coupled with the coolant circuit of the cooling device. The second portion of the second fluid line is preferably arranged downstream of the first portion of the second fluid line, relative to the direction of flow of the second fluid through the second fluid line, and may open into the cooling device in the region of an upper side of the cooling device facing the rear wall of the galley or in the region of a rear side of the cooling device facing the rear wall of the galley. Connecting the second portion of the second fluid line to the cooling device in the region of the upper side of the cooling device allows the installation space available between the rear side of the cooling device and the rear wall of the galley for installation of supply lines for the galley to be maximized. Connecting the second portion of the second fluid line to the cooling device in the region of the rear side of the cooling device, on the other hand, allows the heat exchange surfaces between the second fluid line and the coolant circuit of the cooling device to be maximized, thus allowing the cooling capacity of the cooling device to be increased.

In a preferred embodiment of the cooling system, not only the second fluid line, but also the first fluid line, comprises a first portion integrated into or arranged adjacent to the worktop of the galley, wherein the first portion of the first fluid line may be configured to be flowed through with the first fluid in a direction parallel to the worktop. In particular, the first portion of the first fluid line may extend substantially parallel to the worktop, i.e., parallel to the lower and/or the upper surface of the worktop. Such a configuration of the cooling system allows the space requirement of the cooling system to be minimized further. In case the first portion of the first fluid line is arranged adjacent to the worktop, the first portion of the first fluid line may be arranged either below a lower surface of the worktop or above an upper surface of the worktop. A first portion of the first fluid line which is arranged adjacent to the worktop may be connected to a further portion of the second fluid line which extends substantially perpendicular to the upper and the lower surface of the worktop through the worktop.

Similarly to the first portion of the second fluid line, the first portion of the first fluid line may also comprise a first sub-portion extending parallel to the rear wall of the galley and a sub-portion extending substantially perpendicularly to the rear wall of the galley. The first sub-portion of the first portion of the first fluid line is preferably arranged parallel to the first sub-portion of the first portion of the second fluid line at a greater distance from the rear wall of the galley than the first sub-portion of the first portion of the second fluid line. The second sub-portion of the first portion of the first fluid line preferably opens into a second portion of the first fluid line which connects the first portion of the first fluid line to the cooling device and thus establishes a connection between the first portion of the first fluid line and the portion of the first fluid line that is thermally coupled with the coolant circuit of the cooling device. The second portion of the first fluid line preferably opens into the cooling device in the region of the upper side of the cooling device facing the worktop of the galley.

The first fluid line can be used to circulate first fluid, in particular air, cooled by means of the cooling device through the base structure of the galley. To that end, the first portion of the first fluid line may be provided with at least one fluid inlet, preferably with a plurality of fluid inlets, which may be formed in an underside of the worktop. First fluid cooled by means of the cooling device can be guided via a third portion of the first fluid line and a fluid outlet provided in the third portion of the first fluid line, into a region of the base structure of the galley close to the floor and recirculated into the cooling device again via the first and then the second portion of the first fluid line. The direction of flow of the first fluid cooled by the cooling device through the first fluid line may, however, also be reversed, that is to say, first fluid cooled by the cooling device may also be guided into the base structure of the galley via the second and then the first portion of the first fluid line and returned to the cooling device again via the third portion of the first fluid line. A feed device for feeding the first fluid through the first fluid line may be in the form of a fan, for example, and is preferably integrated into the cooling device.

The cooling device may be installed in the region of a side wall of the galley or integrated into a side wall of the galley. However, the cooling device is preferably installed in the region of an intermediate wall or integrated into an intermediate wall which divides the base structure of the galley into a first and a second portion. The cooling device can then supply both portions of the base structure of the galley equally with cooled first fluid. The first portion of the second fluid line then preferably comprises two first sub-portions extending parallel to the rear wall of the galley and two second sub-portions extending substantially parallel to the intermediate wall and at a distance from one another. A region of the worktop that remains free between the two sub-portions can then be used to guide supply lines for the galley through the worktop. The first portion of the first fluid line, on the other hand, may comprise two first sub-portions which extend parallel to the rear wall of the galley and open into a second sub-portion extending substantially perpendicularly to the rear wall of the galley, since no supply lines for the galley have to be guided through the region of the worktop that is further away from the rear wall of the galley.

In a method of operating a cooling system for a galley for installation in a transportation means, in particular an aircraft, a coolant is guided through a coolant circuit of a cooling device. A first fluid is guided through a first fluid line which is thermally coupled with the coolant circuit of the cooling device in order to transfer heat from the first fluid flowing through the first fluid line to the coolant circulating in the coolant circuit. A second fluid is guided through a second fluid line which is thermally coupled with the coolant circuit of the cooling device in order to transfer heat from the coolant circulating in the coolant circuit to the fluid flowing through the second fluid line. The second fluid line comprises a first portion integrated into or arranged adjacent a worktop of the galley, wherein the first portion of the second fluid line is flowed through with the second fluid in a direction parallel to the worktop.

In case the first portion of the second fluid line is integrated into the worktop and/or in case the first portion of the second fluid line is arranged adjacent to the worktop below a lower surface of the worktop, the second fluid is preferably guided into the second fluid line through at least one fluid inlet of the second fluid line formed in an upper side of the worktop adjacent to a rear wall of the galley.

In case the first portion of the second fluid line is arranged adjacent to the worktop above an upper surface of the worktop, the second fluid may be guided into the second fluid line through at least one fluid inlet formed in an upper wall of the first portion of the second fluid line.

The second fluid may be guided through a filter element arranged, relative to the direction of flow of the second fluid towards the fluid inlet of the second fluid line, upstream of the fluid inlet of the second fluid line in the region of the rear wall of the galley.

The second fluid is preferably guided through a first portion of the second fluid line which comprises a first sub-portion extending parallel to the rear wall of the galley and a second sub-portion extending substantially perpendicularly to the rear wall of the galley.

The second fluid may be guided through a second fluid line which comprises a second portion which is arranged, relative to the direction of flow of the second fluid through the second fluid line, in particular downstream of the first portion and which connects the first portion of the second fluid line to the cooling device in the region of an upper side of the cooling device facing the worktop of the galley or in the region of a rear side of the cooling device facing the rear wall of the galley.

The first fluid may be guided through a first fluid line which comprises a first portion integrated into or arranged adjacent to the worktop of the galley, wherein the first portion of the first fluid line may be flowed through with the first fluid in a direction parallel to the worktop. The first portion may comprise a first sub-portion extending parallel to the rear wall of the galley and a second sub-portion extending substantially perpendicularly to the rear wall of the galley. The second sub-portion preferably opens into a second portion of the first fluid line which connects the first portion of the first fluid line to the cooling device, in particular in the region of an upper side of the cooling device facing the worktop of the galley.

The cooling device may be integrated into an intermediate wall which divides a base structure of the galley into a first and a second portion. The second fluid may be guided through a first portion of the second fluid line which comprises two first sub-portions extending parallel to the rear wall of the galley and two second sub-portions extending substantially parallel to the intermediate wall and at a distance from one another. The first fluid may be guided through a first portion of the first fluid line which comprises two first sub-portions which extend parallel to the rear wall of the galley and open into a second sub-portion extending substantially perpendicularly to the rear wall of the galley.

A galley suitable for installation in a transportation means comprises a cooling system described above.

A cooling system described above and/or a galley described above is/are particularly advantageously suitable for use in an aircraft.

BRIEF DESCRIPTION OF THE DRAWINGS

A preferred embodiment of the invention will now be described in greater detail with reference to the accompanying schematic drawings, in which.

DETAILED DESCRIPTION OF THE PREFERRED EMBODIMENTS

Figure 1:
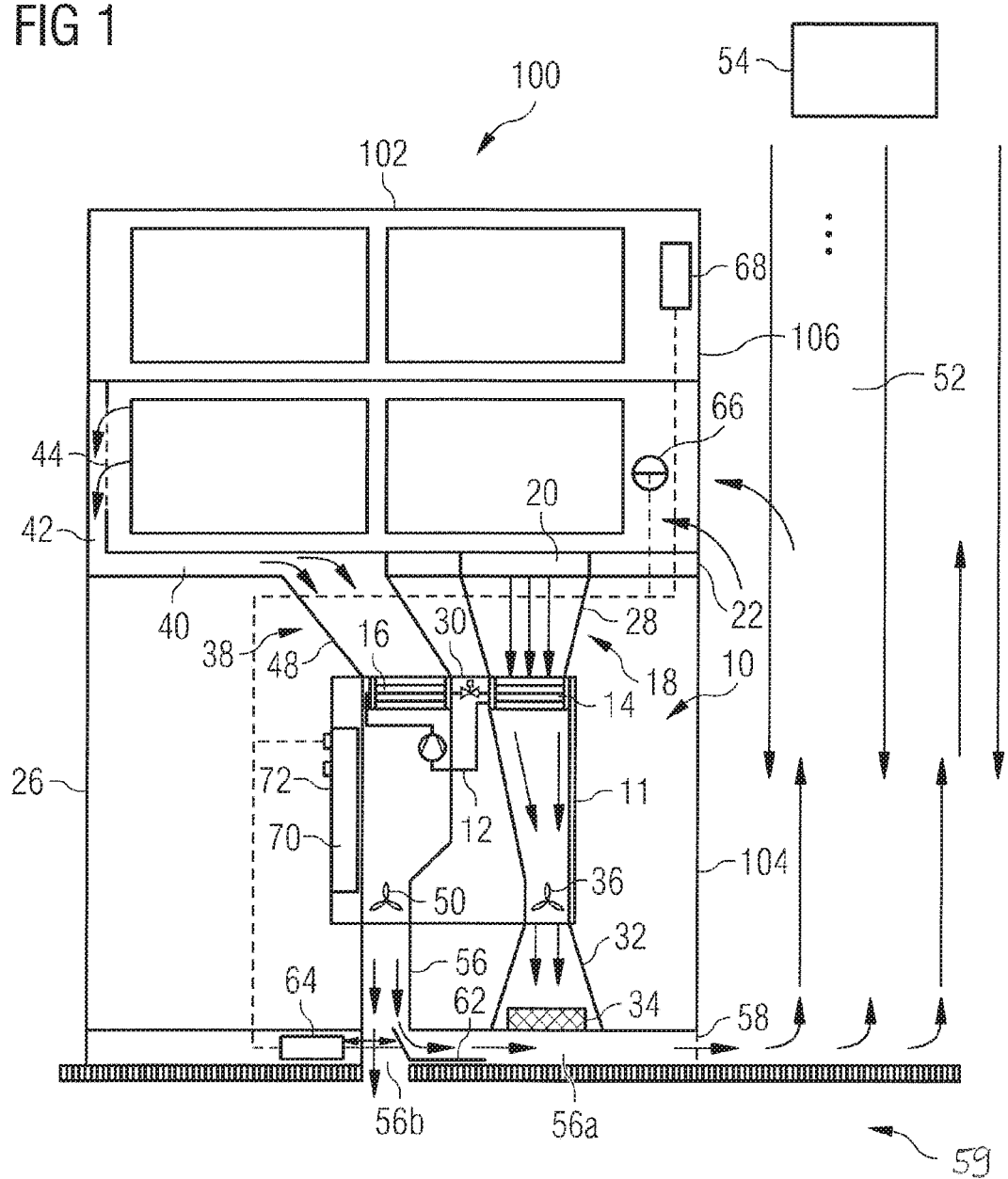
FIG. 1 shows a galley equipped with a first embodiment of a cooling system.

FIG. 1 shows a galley 100 which is suitable, in particular, for installation in a passenger cabin of a commercial aircraft. The galley 100 comprises a carcass 102 having a base structure 104 as well as overhead cabinets 106 arranged above the base structure 104. Kitchen equipment, such as, for example, coffee machines, water boilers, ovens, etc., as well as drinks and foodstuffs, are housed in the overhead cabinets 106. In the base structure 104 of the galley 100, on the other hand, there is arranged a trolley compartment for accommodating movable trolleys which are loaded with items, such as, for example, drinks and foodstuffs, which are to be served to the passengers in the passenger cabin of the commercial aircraft. A cooling system 10 serves to cool the trolley compartment arranged in the base structure 104 of the galley 100.

The cooling system 10 comprises a cooling device 11 having a coolant circuit 12 through which a two-phase coolant flows. An evaporator 14 and a condenser 16 are arranged in the coolant circuit 12. When coolant flows through the evaporator 14, the coolant flowing through the coolant circuit 12 takes up heat and is thereby converted from the liquid to the gaseous state of aggregation. By contrast, when the coolant flows through the condenser 16, the coolant flowing through the coolant circuit 12 is cooled by giving off heat energy and is converted from the gaseous back into the liquid state of aggregation again. The cooling device 11 is integrated into an intermediate wall 17 which divides the base structure 104 of the galley 100 into a first and a second portion 104a, 104b.

A first fluid to be cooled by means of the cooling device 11 flows through a first fluid line 18. In the embodiment of a cooling system 10 shown in the figures, the first fluid is air, that is to say the cooling device 11 is in the form of an air chiller. The first fluid line 18 is thermally coupled with the coolant circuit 12 of the cooling device 11 via the evaporator 14, in order to transfer heat from the first fluid flowing through the first fluid line 18 to the coolant circulating in the coolant circuit 12. The first fluid is thus cooled to a desired low temperature as it flows through the evaporator 14.

Figure 2:
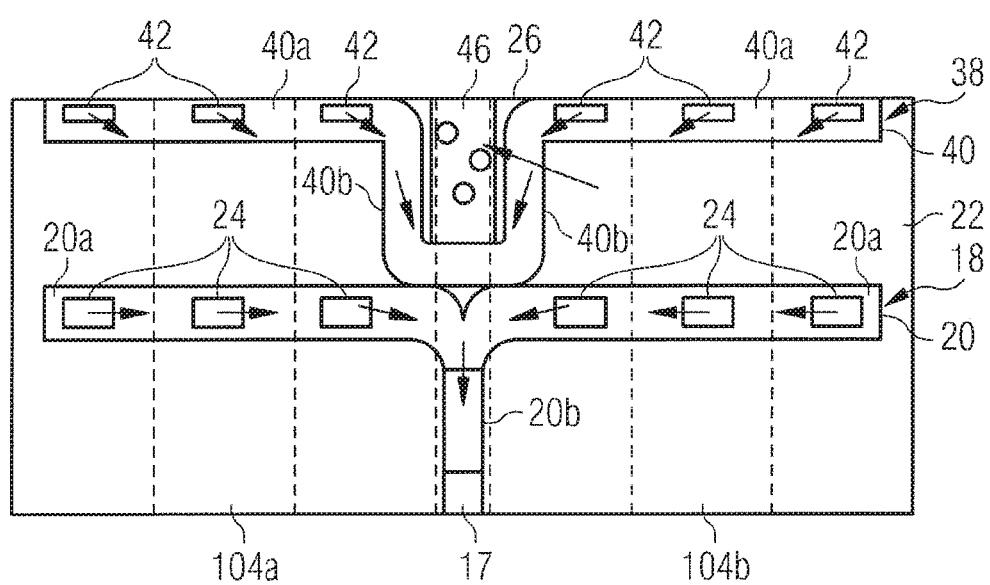
FIG. 2 is a plan view of a worktop of the aircraft galley according to FIG. 1.

The first fluid line 18 comprises a first portion 20 shown in FIG. 2 which is integrated in a space-saving manner into a worktop 22 of the galley 100. The first portion 20 of the first fluid line 18, which extends substantially parallel to the worktop, i.e., parallel to a lower and an upper surface of the worktop, is configured to be flowed through with the first fluid in a direction parallel to the worktop 22. Alternatively, it is, however, also conceivable to arrange the first portion 20 of the first fluid line 18 adjacent to the worktop 22, either below a lower surface of the worktop 22 or above an upper surface of the worktop 22. The worktop 22 separates the base structure 104 of the galley 100 from the overhead cabinets 106 of the galley 100. The first portion 20 of the first fluid line 18 is provided with a plurality of fluid inlets 24 which are formed in an underside of the worktop 22 facing the base structure 104 of the galley 100. The fluid inlets 24 in particular open into two first sub-portions 20a of the first portion 20 of the first fluid line 18 which extend substantially parallel to a rear wall 26 of the galley. The two first sub-portions 20a of the first portion 20 of the first fluid line 18 in turn open into a second sub-portion 20b of the first portion 20 of the first fluid line 18 which extends substantially perpendicularly to the rear wall 26 of the galley 100.

As can be seen in FIG. 2, the second sub-portion 20b of the first portion 20 of the first fluid line 18 is connected to a second portion 28 of the first fluid line 18 which opens into the cooling device 11 in the region of an upper side 30 of the cooling device 11 facing the worktop 22 and thus produces a connection between the first portion 20 of the first fluid line 18 and a portion of the first fluid line 18 that is thermally coupled with the coolant circuit 12 of the cooling device 11 via the evaporator 14. If desired, the cooling device 11 may also be arranged immediately beneath the worktop 22. The second portion 28 of the first fluid line 18 is then formed by an opening formed in the worktop 22 which connects the first portion 20 of the first fluid line 18 to the cooling device 11.

A third portion 32 of the first fluid line 18 connects the cooling device 11 to two fluid outlets 34 which open into the portions 104a, 104b of the base structure 104 of the galley 100. First fluid cooled by means of the cooling device 11 can thus be guided via the third portion 32 of the first fluid line 18 and the fluid outlets 34 into a region of the base structure 104 close to the floor and recirculated into the cooling device 11 again via the first portion 20 and then the second portion 28 of the first fluid line 18. The direction of flow of the first fluid cooled by the cooling device 11 through the first fluid line 18 may, however, also be reversed.

A feed device 36 for feeding the first fluid through the first fluid line 18 may be in the form of a fan, for example, and is integrated into the cooling device 11 in the embodiment of a cooling system 10 shown here. The feed device 36 for feeding the first fluid through the first fluid line 18 is, in particular, arranged in the first fluid line 18 downstream of the thermal coupling of the first fluid line 18 with the evaporator 14 of the cooling device 11, relative to the direction of flow of the first fluid through the first fluid line 18.

A second fluid flows through a second fluid line 38. In the embodiment of a cooling system 10 shown in the figures, the second fluid is also air. The second fluid line 38 is thermally coupled with the coolant circuit 12 of the cooling device 11 via the condenser 16 in order to transfer heat from the coolant circulating in the coolant circuit 12 to the second fluid flowing through the second fluid line 38. The second fluid is thus used to cool coolant circulating in the coolant circuit 12.

As can in turn be seen in FIG. 2, the second fluid line 38 also comprises a first portion 40 which is integrated in a space-saving manner into the worktop 22 of the galley 100. The first portion 40 of the second fluid line 38, which extends substantially parallel to the worktop, i.e., parallel to a lower and an upper surface of the worktop, is configured to be flowed through with the second fluid in a direction parallel to the worktop 22. Alternatively, it is, however, also conceivable to arrange the first portion 40 of the second fluid line 38 adjacent to the worktop 22, either below a lower surface of the worktop 22 or above an upper surface of the worktop 22. The first portion 40 of the second fluid line 38 is provided with a plurality of fluid inlets 42 which are formed in an upper side of the worktop 22 adjacent to the rear wall 26 of the galley 100. Air can thus be discharged from the interior of an overhead cabinet 106 via the fluid inlets 42 and guided as the second fluid through the second fluid line 38. Before being fed into the second fluid line 38, the air discharged from the interior of the overhead cabinet 106 is guided through a filter element 44 which, relative to the direction of flow of the air towards the second fluid line 38, is arranged upstream of the fluid inlets 42 in the region of the rear wall 26 of the galley 100. Since the first portion 40 of the second fluid line 38 is integrated into the worktop 42 of the galley 100 and does not require any installation space in the region of the rear wall 26 of the galley, the filter element 44 may be formed over a large area.

The fluid inlets 42 open into two first sub-portions 40a of the first portion 40 of the second fluid line 38 which extend substantially parallel to the rear wall 26 of the galley. The two first sub-portions 40a of the first portion 40 of the second fluid line 38 in turn each open into a second sub-portion 40b of the first portion 40 of the second fluid line 38. The two second sub-portions 40b of the first portion 40 of the second fluid line 38 extend substantially perpendicularly to the rear wall 26 of the galley 100 and substantially parallel to the intermediate wall 17 at a distance from one another. The second fluid may be guided via the two second sub-portions 40b of the first portion 40 of the second fluid line 38 towards a cooling device 11 which, as is shown in FIG. 1, is installed at a distance from the rear wall 26 of the galley 100. A gap between the cooling device 11 and the rear wall 26 of the galley 100 can then be used as installation space for supply lines 46 for the galley 100, such as, for example, water lines, vacuum lines or the like. A region of the worktop 22 that remains free between the two second sub-portions 40b of the first portion 40 of the second fluid line 38 can be used to guide the supply lines 46 of the galley 100 through the worktop 22, as is illustrated in FIG. 2.

The second fluid line 38 further comprises a second portion 48 which, relative to the direction of flow of the second fluid through the second fluid line 38, is arranged downstream of the first portion 40 and consequently connects the first portion 40 of the second fluid line 38 to the cooling device 11, that is to say, to a portion of the second fluid line 38 that is thermally coupled with the coolant circuit 12 of the cooling device 11. In the arrangement according to FIG. 1, the second portion 48 of the second fluid line 38 opens into the cooling device 11 in the region of the upper side 30 of the cooling device 11 facing the worktop 22.

Like the feed device 36 for feeding the first fluid through the first fluid line 18, a feed device 50 for feeding the second fluid through the second fluid line 38 may also be in the form of a fan. In the embodiment shown here of a cooling system 10, the feed device 50 for feeding the second fluid through the second fluid line 38 is integrated into the cooling device 11 and, relative to the direction of flow of the second fluid through the second fluid line 38, is arranged in the second fluid line 38 downstream of the thermal coupling of the second fluid line 38 with the condenser 16 of the cooling device 11.

Relative to the direction of flow of the air through the second fluid line 38, the second fluid line 38 can be connected downstream of the thermal coupling of the second fluid line 38 with the coolant circuit 12 of the cooling device 11 to a cabin region 52 of the aircraft accommodating the galley 100, in order to supply the cabin region 52 with air warmed by heat transfer from the coolant circulating in the coolant circuit 12 of the cooling device 11. The warm air flowing through the second fluid line 38 can accordingly be used to heat the cabin region 52, to which cold air-conditioning air having a temperature of about 12° C. is supplied by an aircraft air-conditioning system 54 and at which, moreover, cooling energy is also given off from cold surfaces of the cooled base structure 104 of the galley 100, as well as from cold inside surfaces of aircraft doors (not shown). The energy outlay for additional heating of the cabin region 52, which is necessary in order to create comfortable working conditions in the cabin region 52 for the cabin personnel, can thus be minimized.

To that end, the second fluid line 38 has a third portion 56 which, relative to the direction of flow of the second fluid through the second fluid line 38, is arranged downstream of the cooling device 11. The third portion 56 of the second fluid line 38 branches into a first sub-portion 56a and a second sub-portion 56b. The first sub-portion 56a of the third portion 56 of the second fluid line 38 opens into an air outlet 58 which is arranged in the region of a front side of the galley 100 and via which the warm air flowing through the second fluid line 38 can be guided into the cabin region 52 close to the floor. Air leaving the air outlet 58 then rises in the cabin region 52 as a result of natural convection and mixes with the cold air supplied by the aircraft air-conditioning system 54.

Via the second sub-portion 56b, on the other hand, the second fluid line 38 can be connected to an intermediate deck 59 of the aircraft, so that warm air flowing through the second fluid line 38 can also be supplied to the intermediate deck 59 of the aircraft. In the region in which the third portion 56 of the second fluid line 38 branches into the first and second sub-portions 56a, 56b, a valve 62 is arranged in the second fluid line 38. The valve 62 is configured to control the volume flow of warm air flowing through the second fluid line 38 into the cabin region 52 accommodating the galley 100 and/or into the intermediate deck 59 as desired.

In the embodiments of a cooling system 10 shown in the figures, the valve 62 is in the form of a flap which can be actuated by means of a controllable actuator 64. Depending on the position of the valve 62, the warm air flowing through the second fluid line 38 can be guided either solely into the cabin region 52 or solely into the intermediate deck 59. Alternatively, the air stream flowing through the second fluid line 38 can, however, also be divided by the valve 62 into partial volume flows which can then be supplied to the cabin region 52 and the intermediate deck 59 as required.

A temperature sensor 66 provided in the region of the front side of the galley 100 serves to detect the actual temperature in the cabin region 52 accommodating the galley 100. Furthermore, a setting device 68 for setting a desired temperature in the cabin region 52 is mounted in the region of the front side of the galley 100. In the embodiments of a cooling system 10 shown in the figures, the setting device 68 is in the form of a manually operable interface. Signals emitted by the temperature sensor 66 and by the setting device 68 are fed to an electronic control unit 70.

The electronic control unit 70 is configured to control the operation of the valve 62 arranged in the second fluid line 38, the operation of the feed device 50 for feeding the second fluid through the second fluid line 38 and the operation of the cooling device 11 in dependence on the signals emitted by the temperature sensor 66 and the setting device 68, that is to say, in dependence on the actual temperature in the cabin region 52 accommodating the galley 100 detected by the temperature sensor 66 and in dependence on the desired temperature in the cabin region 52 set by the setting device 68. In particular, the electronic control unit 70 controls the operation of the valve 62 arranged in the second fluid line 38, the operation of the feed device 50 for feeding the second fluid through the second fluid line 38, and the operation of the cooling device 11 in such a manner that the actual temperature in the cabin region 52 is approximately the same as the desired temperature, and comfortable temperatures are thereby achieved in the cabin region 52.

Figure 3:
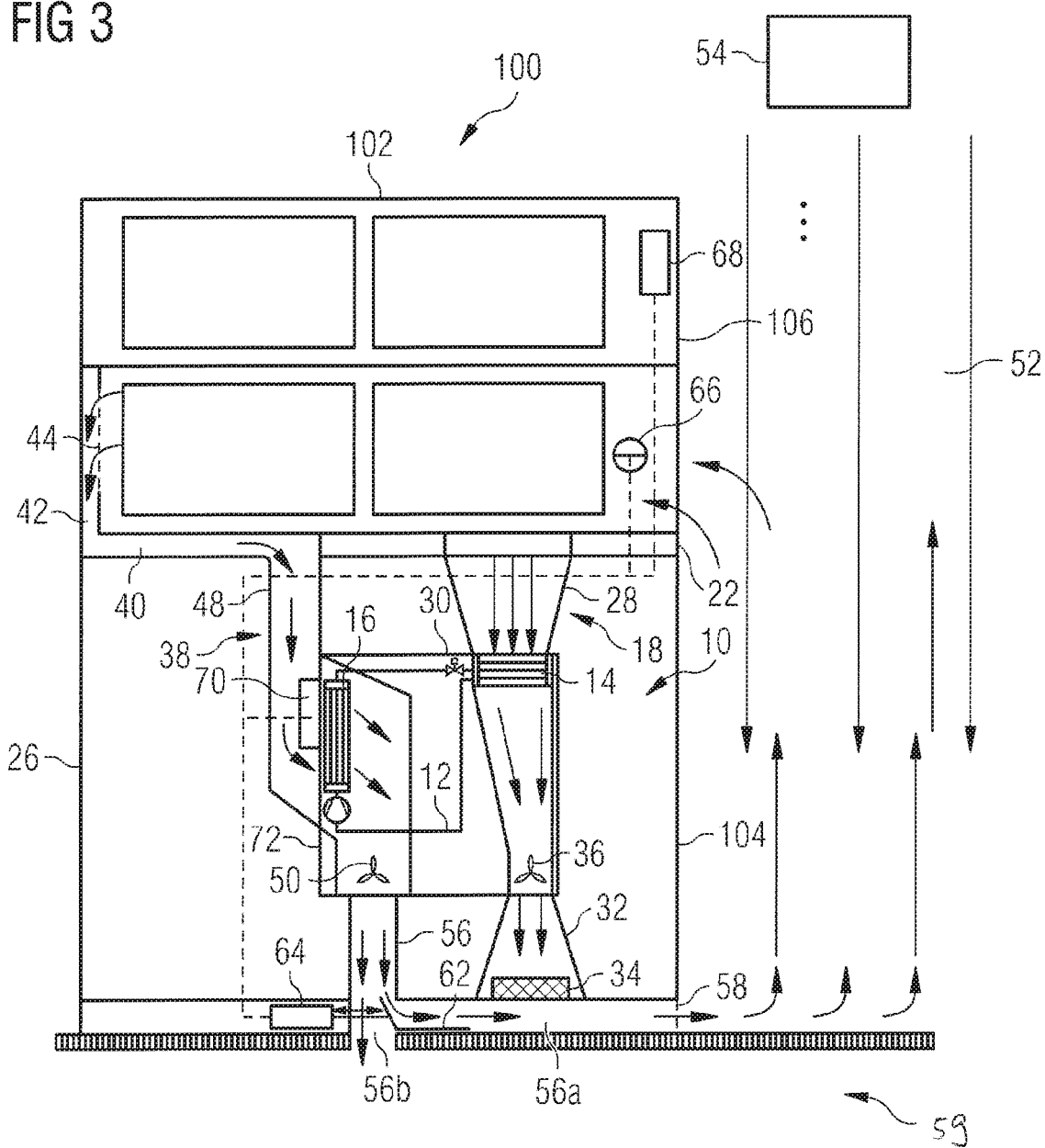
FIG. 3 shows a galley equipped with an alternative embodiment of a cooling system.

The galley 100 shown in FIG. 3 differs from the arrangement according to FIG. 1 only in that the second portion 48 of the second fluid line 38 opens into the cooling device 11, not in the region of the upper side 30 of the cooling device 11 facing the worktop 22, but in the region of a rear side 72 facing the rear wall 26 of the galley 100. Connecting the second portion 48 of the second fluid line 38 to the cooling device in the region of the upper side 30 of the cooling device 11 allows the installation space available between the rear side 72 of the cooling device 11 and the rear wall 26 of the galley 100 for installation of the supply lines 46 for the galley 100 to be maximized. Connecting the second portion 48 of the second fluid line 38 to the cooling device 11 in the region of the rear side 72 of the cooling device 11, on the other hand, allows the heat exchange surfaces between the second fluid line 38 and the coolant circuit 12 of the cooling device 11 to be maximized, thus allowing the cooling capacity of the cooling device 11 to be increased.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cooling system for a galley for installation in a transportation means, comprising:
a cooling device which comprises a coolant circuit configured to be flowed through with a coolant,
a first fluid line configured to be flowed through with a first fluid and which is thermally coupled with the coolant circuit of the cooling device in order to transfer heat from the first fluid flowing through the first fluid line to the coolant circulating in the coolant circuit,
a second fluid line configured to be flowed through with a second fluid and which is thermally coupled with the coolant circuit of the cooling device in order to transfer heat from the coolant circulating in the coolant circuit to the second fluid flowing through the second fluid line,
wherein the second fluid line comprises a first portion integrated into or arranged adjacent to a worktop of the galley, the first portion of the second fluid line being configured to be flowed through with the second fluid in a direction parallel to the worktop, and
wherein the second fluid is guided into the second fluid line through at least one fluid inlet of the second fluid line formed in an upper side of the worktop adjacent to a rear wall of the galley.

2. The cooling system according to claim 1, further comprising a filter element arranged upstream of the fluid inlet of the second fluid line in the region of the rear wall of the galley.

3. The cooling system according to claim 1, wherein the first portion of the second fluid line comprises a first sub-portion extending parallel to a rear wall of the galley and a second sub-portion extending substantially perpendicularly to the rear wall of the galley.

4. The cooling system according to claim 1, wherein the second fluid line comprises a second portion and which connects the first portion of the second fluid line to the cooling device in the region of an upper side of the cooling device facing the worktop of the galley or in the region of a rear side of the cooling device facing the rear wall of the galley.

5. The cooling system according to claim 4, wherein the second portion is arranged upstream of the first portion.

6. The cooling system according to claim 1, wherein the first fluid line comprises a first portion which is integrated into or arranged adjacent to the worktop of the galley, wherein the second sub-portion preferably opens into a second portion of the first fluid line which connects the first portion of the first fluid line to the cooling device.

7. The cooling system according to claim 1, wherein the first portion comprises a first sub-portion extending parallel to a rear wall of the galley and a second sub-portion extending substantially perpendicularly to the rear wall of the galley.

8. The cooling system according to claim 1, wherein the second portion of the first fluid line connects the first portion of the first fluid line to the cooling device in the region of an upper side of the cooling device facing the worktop of the galley.

9. The cooling system according to claim 1, wherein the cooling device is integrated into an intermediate wall which divides a base structure of the galley into a first and a second portion, and wherein at least one of:
- the first portion of the second fluid line comprises two first sub-portions extending parallel to a rear wall of the galley and two second sub-portions extending substantially parallel to the intermediate wall and at a distance from one another, or
- the first portion of the first fluid line comprises two first sub-portions which extend parallel to a rear wall of the galley and which open into a second sub-portion extending substantially perpendicularly to the rear wall of the galley.

10. A method of operating a cooling system for a galley for installation in a transportation means, comprising the steps:
- guiding a coolant through a coolant circuit of a cooling device,
- guiding a first fluid through a first fluid line which is thermally coupled with the coolant circuit of the cooling device to transfer heat from the first fluid flowing through the first fluid line to the coolant circulating in the coolant circuit, and
- guiding a second fluid through a second fluid line which is thermally coupled with the coolant circuit of the cooling device to transfer heat from the coolant circulating in the coolant circuit to the fluid flowing through the second fluid line,
- wherein the second fluid line comprises a first portion integrated into or arranged adjacent to a worktop of the galley the first portion of the second fluid line being flowed through with the second fluid in a direction parallel to the worktop, and
- wherein the second fluid is guided into the second fluid line through at least one fluid inlet of the second fluid line formed in an upper side of the worktop adjacent to a rear wall of the galley.

11. The method according to claim 10, wherein the second fluid is guided through a filter element arranged upstream of the fluid inlet of the second fluid line in the region of the rear wall of the galley.

12. The method according to claim 10, wherein the second fluid is guided through a first portion of the second fluid line which comprises a first sub-portion extending parallel to a rear wall of the galley and a second sub-portion extending substantially perpendicularly to the rear wall of the galley.

13. The method according to claim 10, wherein the second fluid is guided through a second fluid line which comprises a second portion which connects the first portion of the second fluid line to the cooling device in the region of an upper side of the cooling device facing the worktop of the galley or in the region of a rear side of the cooling device facing the rear wall of the galley.

14. The method according to claim 10, wherein the second portion is arranged downstream of the first portion.

15. The method according to claim 10, wherein the first fluid is guided through a first fluid line comprising a first portion which is integrated into or arranged adjacent to the worktop of the galley, wherein the second sub-portion preferably opens into a second portion of the first fluid line which connects the first portion of the first fluid line to the cooling device.

16. The method according to claim 15, wherein the first portion of the first fluid line comprises a first sub-portion extending parallel to a rear wall of the galley and a second sub-portion extending substantially perpendicularly to the rear wall of the galley, and the second portion of the first fluid line connects the first portion of the first fluid line to the cooling device in the region of an upper side of the cooling device facing the worktop of the galley.

17. The method according to claim 10, wherein the cooling device is integrated into an intermediate wall which divides a base structure of the galley into a first and a second portion, and wherein at least one of:
- the second fluid is guided through a first portion of the second fluid line which comprises two first sub-portions extending parallel to a rear wall of the galley and two second sub-portions extending substantially parallel to the intermediate wall and at a distance from one another, or
- the first fluid is guided through a first portion of the first fluid line which comprises two first sub-portions which extend parallel to a rear wall of the galley and which open into a second sub-portion extending substantially perpendicularly to the rear wall of the galley.

18. A galley comprising a cooling system according to claim 1.

* * * * *